(No Model.)

C. GRIMM.
CHRISTMAS TREE CANDY.

No. 354,509. Patented Dec. 14, 1886.

WITNESSES:
H. N. Rosenbaum.
Carl Kern

INVENTOR
Charles Grimm
BY Goepel & Raegener
ATTORNEYS.

N. PETERS, Photo-Lithographer, Washington, D. C.

UNITED STATES PATENT OFFICE.

CHARLES GRIMM, OF JERSEY CITY, NEW JERSEY.

CHRISTMAS-TREE CANDY.

SPECIFICATION forming part of Letters Patent No. 354,509, dated December 14, 1886.

Application filed October 8, 1886. Serial No. 215,062. (No model.)

*To all whom it may concern:*

Be it known I, CHARLES GRIMM, of Jersey City, in the county of Hudson and State of New Jersey, have invented certain new and useful Improvements in Christmas-Tree Candy, of which the following is a specification.

The object of my invention is to provide an edible Christmas-tree candy, which is highly ornamented and handsome.

Heretofore candies for Christmas trees have been made of icing, composed of a mixture of white of eggs and sugar. As icing is rather brittle and of a granular nature, it is not very pleasant to eat it, and consequently there was a demand for an edible Christmas-tree candy more pleasant for the teeth and the tongue.

My improved Christmas-tree candy consists of a frame of icing filled in with soft or cream candy.

Figure 1:
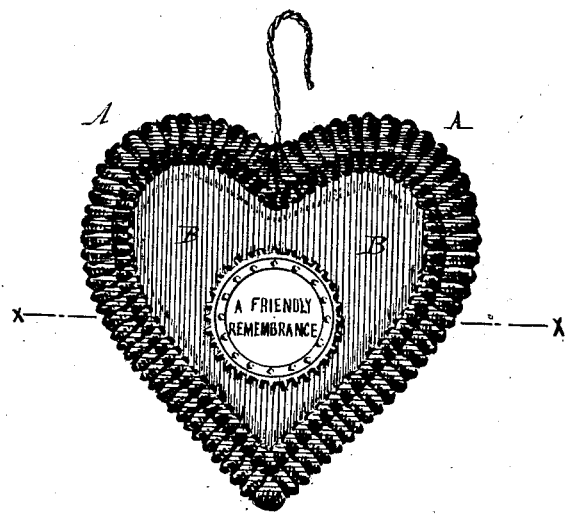
Figure 2:

In the accompanying drawings, Figure 1 is a face view of my improved Christmas-tree candy; and Fig. 2 is a cross-sectional view of the same on line $x\ x$, Fig. 1.

Similar letters of reference indicate corresponding parts.

The frame A is made of icing composed of the white of eggs and sugar in the usual manner, and made of any desired shape, size, or color. The frame A is filled in with the body B of cream-candy, composed of sugar, which does not harden completely. The filling B can be composed of any well-known cream-candy. Pictures, ornaments, mottoes, &c., can be placed on the cream-filling.

Having thus described my invention, I claim as new and desire to secure by Letters Patent—

As a new article of manufacture, an edible Christmas-tree candy composed of a rim or frame of icing and a filling of cream-candy, the top and bottom of the cream-filling being exposed to view, substantially as shown and described.

In testimony that I claim the foregoing as my invention I have signed my name in presence of two subscribing witnesses.

CHAS. GRIMM.

Witnesses:
OSCAR F. GUNZ,
SIDNEY MANN.